May 8, 1945.   B. DIBNER   2,375,741
METHOD OF CONNECTING A SLEEVE TO WIRES
Filed Jan. 17, 1942

BERN DIBNER
INVENTOR.

BY Harry Ernest Rubens
ATTORNEY

Patented May 8, 1945

2,375,741

UNITED STATES PATENT OFFICE 2,375,741

METHOD OF CONNECTING A SLEEVE TO A WIRE

Bern Dibner, Crompond, N. Y.

Application January 17, 1942, Serial No. 427,115

1 Claim. (Cl. 29—148)

This invention relates to connector splices for wires and more particularly to a method of connecting an electrical conductor to a tubular sleeve.

I am primarily concerned with the problem of "keying" in the wire to the inner wall of the sleeve. In general, it has hitherto been necessary to compress the wall of the tubular sleeve, as by indentation, directly into the conductor, reducing its net cross-section and weakening the joint so that, in tests, the wires have broken within the sleeve instead of outside it.

I have found that if the inner wall is provided with a series of pointed cones or pyramids, it would be possible to drive the apex of these projections into the conductor without reducing its net cross-section, the metal forcing itself from the point of contact transversely into the space between the projections. The difficulty, of course, is to produce such projections on the inner wall of a tubular sleeve.

Accordingly, it is the primary object of my invention to produce irregularities on the inner wall of a sleeve which may be driven into the wall of a conductor without reducing its net cross-section.

I accomplish this object of my invention by forcing a tool through the bore which will cause a series of continuous longitudinal V-shaped serrations. While this produces V-shaped irregularities which will not reduce the net cross-section of the wire, the connection has little resistance to forces tending to pull the wire from the sleeve.

A further object of my invention, therefore, is to provide means whereby these longitudinal V-shaped serrations will have the effect of pointed projections in resisting removal of the wire. I accomplish this object of my invention by providing a longitudinally interrupted series of compressive operations on the outside of the sleeve, which causes the longitudinal serrations on the inner bore to be driven into the wire in the form of a discontinuous line, thus producing, in effect, pointed projections.

I accomplish these and other objects and obtain my new results as will be apparent from the device described in the following specification, particularly pointed out in the attached claim, and illustrated in the accompanying drawing, in which:

Figure 1:
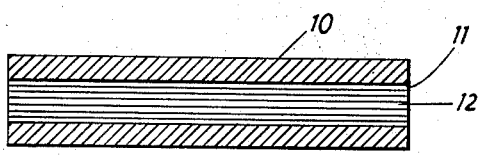
Fig. 1 is a longitudinal sectional view of a tubular sleeve with longitudinal serrations.
Figure 2:
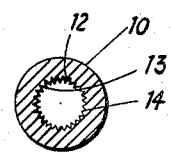
Fig. 2 is an end view of the same.

Referring more particularly to the drawing, reference numeral 10 designates a tubular sleeve having a bore 11.

The bore is provided with continuous serrations 12 by laterally inserting a tool into the bore which will cut the surface of the bore into the desired shape, as the tool passes therethrough.

The serrations 12 thus formed are substantially V-shaped with the point 13 of the V being the entering means into the wire when the wall of the sleeve is compressed, and 14 being the valley of the serrations. The point of the V may be formed slightly rounded without substantially interfering with the operation of the device.

As is apparent, the more interruptions formed, the greater the number of points of contact with the wire, and the greater the "pull-out" values of the final connection.

Figure 5:
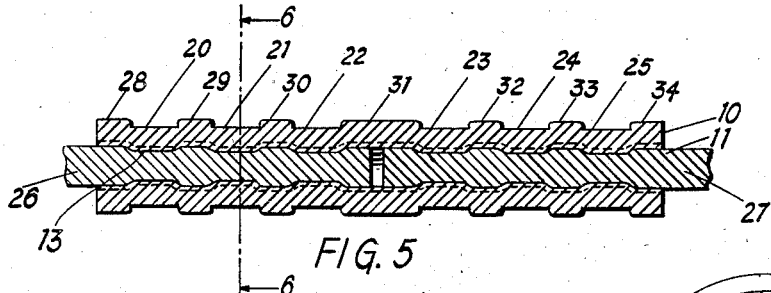
Fig. 5 is a longitudinal sectional view of the sleeve illustrated in Fig. 1 compressed on a wire in a series of longitudinally interrupted indentations.
Figure 8:
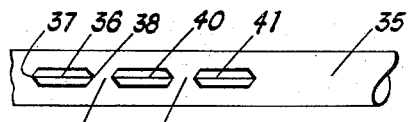
Fig. 8 is the impression of the longitudinal serration produced on a wire, with an interrupted compression of the sleeve.

In Fig. 5, a series of indentations 20 to 25 inclusive, formed by a compressing tool, not shown, serve to compress the serrations directly underneath them into the wires 26 and 27. These indentations are interrupted longitudinally to allow uncompressed portions 28 to 34 of the sleeve to remain between longitudinally adjacent indentations. The effect on the wire is illustrated in Fig. 8, where the impression of the indented serrations is indicated on the wire 35. Here the highest point of the serration causes the deepest impression, as is indicated by reference numeral 36, extending between points 37 and 38, the longitudinal extremes of the indentation. The space 39 is between indentations and is therefore unmarked.

Figure 7:
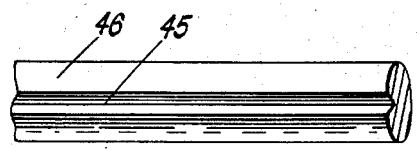
Fig. 7 is the impression of the longitudinal serration produced on a wire, with a continuous compression of the sleeve.

Reference numerals 40 and 41 indicate the indentations following with the unindented space 42 separating them. This is in contrast to a single longitudinal impression 45, see Fig. 7, produced in the wire 46, as a result of a single compression, without longitudinal interruptions.

Figure 6:
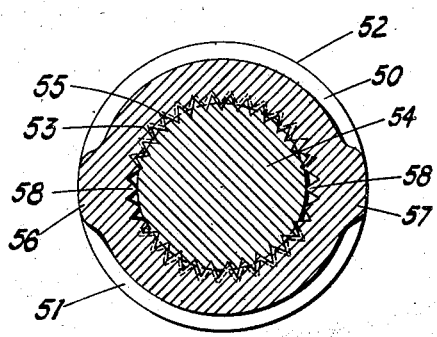
Fig. 6 is a transverse sectional view through line 6—6 of Fig. 5.

The result is shown in detail in Fig. 6, where an enlarged cross-sectional view of the connection is illustrated. The indentations 50 and 51, produced on the sleeve 52, are semi-circular in form, and result in the longitudinal serrations 53 being forced into the wire 54. The metal 55 displaced by the serrations is laterally forced into position between the serrations without loss of net cross-section by the wire.

At points 56 and 57, where the sleeve was not compressed, the serrations 58 are not forced into the wire.

By the foregoing I have succeeded in utilizing longitudinal serrations on the inner surface of a tubular sleeve, which serrations may be longitudinally produced by any method, and produce a connection between a sleeve and wire without damaging the wire, and without introducing foreign particles into the sleeve which usually lower the electrical joint efficiency of the connection. The serrations are of the same composition as the sleeve, thus maintaining the highest degree of conductivity. Where it is desired to make the serrations of a material slightly harder than the wire, the sleeve may be formed of the desired material and the serrations formed will thus have the desired hardness.

Figure 3:
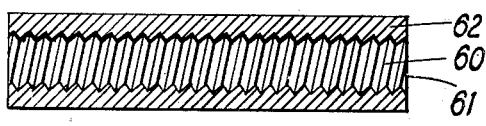
Fig. 3 is a longitudinal sectional view with threaded serrations.
Figure 4:
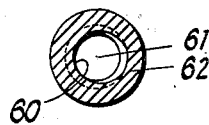
Fig. 4 is an end view of the same.

A form of serrations which may be produced into the bore of the sleeve which is desirable, is that produced by a threading operation. This is shown in Figures 3 and 4, where the threaded portion 60 is shown in the inner bore 61 of the sleeve 62. This type of indentation is more expensive to make and depending on the pitch of the thread which should be large and the number of threads per inch which should be small, could probably produce a type of connection that would not substantially reduce the net cross-section of the conductor, when compressed thereon.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which, objects of my invention are attained and new results accomplished, as it is obvious that the particular embodiments herein shown and described are only some of the many that can be employed to attain these objects and accomplish these results.

What I claim and desire to secure by Letters Patent is as follows:

The method of forming a connection between a tubular sleeve and a wire, which comprises forming longitudinally extending ridges on the inner surface of the sleeve having a predetermined cross-section which extends uniformly throughout the length of the ridges; inserting the wire into the bore; and thereafter applying an indentation on the outer surface of the sleeve at a predetermined position which indentation extends to the inner surface thereof, forcing a portion only of the length of the ridges into the wire.

BERN DIBNER.